United States Patent [19]

Watkins

[11] Patent Number: 4,923,009

[45] Date of Patent: May 8, 1990

[54] STEAM ENHANCED OIL RECOVERY PROCESSES AND COMPOSITIONS FOR USE THEREIN

[75] Inventor: David R. Watkins, Irvine, Calif.

[73] Assignee: Union Oil Company of California, Brea, Calif.

[21] Appl. No.: 348,219

[22] Filed: May 5, 1989

[51] Int. Cl.$^5$ .................. B21B 43/22; B21B 43/24; B21B 33/134

[52] U.S. Cl. .................. 166/272; 166/288; 166/294; 166/303; 252/8.554

[58] Field of Search ............ 166/272, 288, 294, 303, 166/304; 252/8.554

[56] References Cited

U.S. PATENT DOCUMENTS

| | | | |
|---|---|---|---|
| 3,412,793 | 11/1968 | Needham | 166/288 X |
| 3,993,133 | 11/1976 | Clampitt | 166/288 X |
| 4,014,926 | 3/1977 | Dear et al. | |
| 4,089,804 | 5/1978 | Falk | 252/355 |
| 4,267,887 | 5/1981 | Watanabe | 166/300 |
| 4,432,882 | 2/1984 | Raynolds et al. | 252/8.55 |
| 4,458,759 | 7/1984 | Isaacs et al. | 166/272 |
| 4,475,595 | 10/1984 | Watkins et al. | 166/303 |
| 4,488,976 | 12/1984 | Dilgren et al. | 252/8.554 |
| 4,532,993 | 8/1985 | Dilgren et al. | 166/303 |
| 4,540,050 | 9/1985 | Huang et al. | 166/272 |
| 4,549,609 | 10/1985 | Watkins et al. | 166/303 |
| 4,556,107 | 12/1985 | Duerksen et al. | 166/272 |
| 4,565,639 | 1/1986 | Penny et al. | 252/8.552 |
| 4,572,296 | 2/1986 | Watkins | 166/303 |
| 4,597,442 | 7/1986 | Dilgren et al. | 166/272 |
| 4,607,700 | 8/1986 | Duerksen et al. | 166/303 |
| 4,609,044 | 9/1986 | Lau | 166/270 |
| 4,714,112 | 12/1987 | Nigrini et al. | 166/252 |
| 4,727,938 | 3/1988 | Lau | 166/270 |
| 4,802,533 | 2/1989 | Hsueh et al. | 166/252 |
| 4,823,873 | 4/1989 | Karydas | 166/272 |
| 4,836,281 | 6/1989 | Robin et al. | 166/272 |

OTHER PUBLICATIONS

Clark, Journal of Petroleum Technology, p. 1565–1569 (Jul. 1982).

Holcomb, Proceedings of the 24th Annual Southwestern Petroleum Short Course, 91–100 (1977).

Pike, Paint and Varnish Production, 27–32 (Mar., 1972).

Watkins et al., *SPE Production Engineering*, 471–477 (Nov., 1986).

Blevins et al., *J. Petroleum Technology*, 1141–1150 (Sep., 1969).

Honarpour et al., *Relative Permeability of Petroleum Reservoirs*, pp. 72–74, CRC Press. Inc., Boca Raton, Fla. (1986).

*Primary Examiner*—George A. Suchfield
*Attorney, Agent, or Firm*—Gregory F. Wirzbicki; Shlomo R. Frieman

[57] ABSTRACT

A composition for use in enhanced oil recovery procedures comprises steam having a vapor phase and a liquid phase and a fluorocarbon surfactant partitioned between the liquid and vapor phases. The partitioning of the fluorocarbon surfactant between the two phases is accomplished by maintaining the composition's pH at less than about 11, and preferbly within the range of 7 to about 11. By varying the fluorocarbon surfactant concentration, the composition can be used as a surface tension depressant well stimulation additive and/or as a foam former for selectively blocking more permeable portions of a formation.

72 Claims, No Drawings

4,923,009

STEAM ENHANCED OIL RECOVERY PROCESSES AND COMPOSITIONS FOR USE THEREIN

BACKGROUND

The present invention relates to steam enhanced oil recovery and to steam-containing compositions used in such processes.

Surfactants have been used in enhanced oil recovery processes. For example, various surfactants that lower the surface tension of fluids have been used in oil recovery methods using stimulation fluids. Originally, hydrocarbon surfactants were used. However, hydrocarbon surfactants are limited in their ability to reduce surface tension. Subsequently, fluorochemical surfactants have been used as surface tension depressants for aqueous stimulation fluids.

In addition, surfactants have been used in processes for decreasing the mobility of fluids in subterranean formations. For example, one method entails introducing steam and a foaming agent into a formation to form a foam having steam as its gaseous phase. The foam selectively blocks or plugs the higher permeable channels or sections of the subterranean formation and thereby directs the steam to the more impermeable, oil-bearing portions of the formation.

Due to fluctuating oil prices and the growing scarcity of oil reserves, it is very important that oil recovery processes be conducted as economically efficient as possible. Accordingly, there is a constant need in the oil industry to improve oil recovery technology.

SUMMARY OF THE INVENTION

The present invention contributes to improving oil recovery technology by providing a composition for use in enhanced oil recovery methods. The composition comprises (a) steam having a vapor phase and a liquid phase, and (b) a fluorocarbon surfactant. The composition of the present invention differs from prior art steam-fluorocarbon surfactant containing compositions in that the vapor phase of the composition comprises an efficacious concentration of the fluorocarbon surfactant. When the composition of the present invention is used in an enhanced oil recovery process as a surface tension depressant, an efficacious vapor-phase concentration of the fluorocarbon surfactant is generally at least about 0.5 ppm by volume. Typically, the condensate obtained from the vapor phase has a surface tension of less than about 30 dynes/cm. When the composition is employed to selectively decrease the permeability of subterranean oil-bearing formations, an efficacious vapor-phase fluorocarbon surfactant concentration is usually at least about 50 ppm by volume.

The partitioning of the fluorocarbon surfactant between the vapor phase and the liquid phase is achieved by controlling the pH of the composition's liquid phase. In particular, the pH of the liquid phase is maintained at less than about 11, and preferably from about 7 to about 11. Generally, the pH of the composition is maintained within the desired range by incorporating into the composition a pH-adjusting agent. Typically, the pH-adjusting agent is an ammoniacal nitrogen-containing compound.

In addition to the composition, the present invention also provides (a) a process for recovering oil from an oil-bearing formation and (b) an oil recovery system. The oil-recovery process of the present invention comprises the steps of (i) injecting a composition into at least a portion of the oil-bearing formation, and (ii) withdrawing oil from the oil-bearing formation.

The oil recovery system embodiment of the present invention comprises (i) a well generating at least one oil-bearing formation, (ii) an oil-bearing formation, and (iii) the composition of the instant invention present in at least a portion of the oil-bearing formation.

DETAILED DESCRIPTION OF THE INVENTION

The composition of the present invention comprises steam having a vapor phase and a liquid phase and a fluorocarbon surfactant, at least a portion of which is present in the vapor phase. Generally, the steam has a steam quality of at least about 5 weight percent and typically less than about 95 weight percent. Preferably, the steam has a steam quality of about 10 to about 90 weight percent, and more preferably about 20 to about 85 weight percent.

Cationic, nonionic, anionic, and amphoteric surfactants as well as a mixture thereof can be employed as the fluorocarbon surfactants. Since soil is generally negatively charged, anionic and nonionic fluorocarbon surfactants as well as mixtures thereof are preferably employed in order to reduce the extent of surfactant absorption onto the soil.

Exemplary nonionic fluorocarbon surfactants include, but are not limited to, fluoroalkyl alkoxylates, fluoroalkyl esters, and fluoroalkyl polyoxyethylene ethanols. Fluoroalkyl alkoxylates are the preferred nonionic surfactants.

Exemplary anionic fluorocarbon surfactants include, but are not limited to, fluoroalkyl carboxylate salts, fluoroalkyl sulfonate salts, and fluoroalkyl amidosulfonic acids and salts. Suitable fluoroalkyl amidosulfonic acids and salts are disclosed in U.S. Pat. No. 4,014,926, the entire patent being incorporated herein by reference. The fluoroalkyl carboxylate salts, fluoroalkyl sulfonate salts, and fluoroalkyl amidosulfonic salts have an anion moiety and a cationic salt moiety. Generally, the cation salt moiety is selected from the group consisting of monovalent alkali metals, alkaline earth metals, organic bases, and ammonium. Preferably, the cationic salt moiety is selected from the group consisting of alkali metals (and especially potassium) and ammonium. Fluoroalkyl carboxylate salts are the preferred anionic fluorocarbon surfactants.

A sufficient concentration of the fluorocarbon surfactant is present in the total composition to provide an efficacious concentration of the fluorocarbon in the vapor phase. In one version of the invention, the composition is employed as a surface tension depressant well stimulation additive. In this embodiment, the total composition typically comprises at least about 1 ppm by volume fluorocarbon surfactant. Due to economic constraints, the maximum concentration of the fluorocarbon surfactant present in the surface tension depressant composition is usually less than about 10,000 ppm by volume. Preferably, the surface tension depressant composition has a fluorocarbon concentration of about 5 to about 100 ppm by volume, and more preferably about 10 to about 50 ppm by volume.

In another version of the present invention, the total composition is used to form a foam for selectively blocking more permeable portions of a formation. In this embodiment, the composition generally has a fluorocarbon concentration of at least about 100 ppm by volume. Due to cost restrictions, the maximum concentration of the fluorocarbon surfactant in the foam-forming composition is about 10,000 ppm by volume. Preferably, the fluorocarbon concentration of the foam forming composition is about 150 to about 5,000 ppm by volume, and more preferably about 200 to about 1,000 ppm by volume.

A characteristic feature of the present invention is that the fluorocarbon surfactant is partitioned between the vapor phase and the liquid phase of the steam. The partitioning of the fluorocarbon surfactant between the liquid and vapor phases is achieved by maintaining the pH of the liquid phase at less than about 11. To keep the corrosivity of the composition within acceptable limits, the pH of the liquid phase of the steam is usually within the range of about 7 to about 11. Preferably, the pH of the liquid phase of the steam is about 8 to about 10.5, and more preferably about 8.5 to about 10. Most preferably, the pH of the liquid phase of the steam is about 8.5 to about 9.5.

The concentration of the fluorocarbon surfactant in the liquid phase can be determined by analysis of the liquid phase and the concentration of the fluorocarbon surfactant in the vapor phase can be determined by condensing a portion of the vapor phase and analyzing the condensate. The ratio of the fluorocarbon concentration in the liquid phase of the steam to the fluorocarbon concentration in the vapor phase of the steam is generally less than about 5:1. Preferably, the ratio is less than about 2:1, and more preferably about 1:1. Accordingly, when the fluorocarbon surfactant is equally concentrated in the liquid and vapor phases of the steam, the vapor phase of a surface depressant composition generally contains at least about 0.5, but less than about 5,000, ppm by volume fluorocarbon surfactant. In the case of a foam forming composition, when the fluorocarbon surfactant is equally concentrated in the steam's liquid and vapor phases, the vapor phase of the foam forming composition generally contains at least about 50, but less than about 5,000, ppm by volume fluorocarbon surfactant.

Because the fluorocarbon surfactant is partitioned between the liquid and vapor phases of the steam, when the vapor phase of the surface tension depressant composition is condensed to form a condensate, the condensate generally has a surface tension of less than about 30 dynes/cm, but typically at least about 17 dynes/cm. Preferably, the condensate of the vapor phase of the surface tension depressant composition has a surface tension within the range of about 20 to about 25 dynes/cm.

In order for the pH of the liquid phase of the steam to be within the above ranges, it is necessary that either the feed water employed to form the steam be substantially devoid of basic precursors such as carbonate ions or that a pH-adjusting agent be added to the composition. Since it is economically prohibitive to employ substantially carbonate-free or other basic precursor-free feed water, in a preferred version of the invention the composition further comprises a pH-adjusting agent. Exemplary pH-adjusting agents that can be employed to maintain the pH of the liquid phase of the steam within the above ranges are disclosed in U.S. Pat. No. 4,475,595; U.S. Pat. No. 4,549,609; U.S. Pat. No. 4,572,296; U.S. Pat. No. 4,714,112; and U.S. Pat. No. 4,802,533, these patents being incorporated herein in their entirety by reference.

In U.S. Pat. No. 4,475,595, the pH-adjusting agent is an ammonium or a substituted ammonium compound selected from the group consisting of ammonium halides, ammonium salts of inorganic acids, ammonium salts of carboxylic acids, quaternary ammonium halides, and amine or substituted amine hydrochlorides. Illustrative ammonium halides include, but are not limited to, ammonium chloride, ammonium bromide, ammonium fluoride, ammonium bifluoride, and ammonium iodide. Exemplary ammonium salts of inorganic acids include ammonium nitrate, ammonium nitrite, ammonium sulfate, ammonium sulfite, ammonium sulfamate, ammonium carbonate, ammonium borate, ammonium chromate, and ammonium dichromate. Suitable ammonium salts of carboxylic acid include, but are not limited to, ammonium acetate, ammonium citrate, ammonium tartrate, ammonium formate, ammonium palate, and ammonium benzoate.

The quaternary ammonium pH-adjusting agents of U.S. Pat. No. 4,475,595 can be represented by the formula

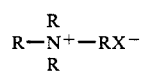

wherein at least one of the R groups is an organic hydrophobic group containing 1 to about 20 carbon atoms. The other substituents are independently alkyl or hydroalkyl groups containing 1 to about 4 carbon atoms, alkoxy groups of the formula (C H, or benzyl groups of the formula $(CH_3C_6H_5O)_nH$, where n is an integer from about 2 to about 10. X is an anion, preferably selected from the group consisting of halides and ethyl sulfate. More preferably, X is chloride. Exemplary quaternary ammonium pH-adjusting agents are tetramethylammonium chloride, dioctyldimethylammonium chloride, dodecyltrimethylammonium chloride, cetyltrimethylammonium chloride, cetyltrimethylammonium bromide, dodecyltrimethylbenzylammonium chloride, ethyltrimethylammonium iodide, iodomethyltrimethylammonium iodide, tetraethylammonium enneaiodide, tetramethylammonium hepta- iodide, and methylpyridinum chloride.

The amine or substituted amine hydrochlorides of U.S. Pat. No. 4,475,595 include mono-, di-, and tri-alkyl amine hydrochlorides wherein the alkyl group contains 1 to about 20 carbon atoms, straight chain or branched, aryl amine hydrochlorides, hydroxy-substituted amine hydrochlorides, and heterocyclic substituted amine hydrochlorides. More specifically, exemplary amine and substituted amine hydrochlorides include, but are not limited to, methyl amine hydrochloride, ethyl amine hydrochloride, propyl amine hydrochloride, butyl amine hydrochloride, dodecyl amine hydrochloride, eicosylamine hydrochloride, diethylamine hydrochloride, triethylamine hydrochloride, benzylamine hydrochlororide, naphthylamine hydrochloride, hydroxylamine hydrochloride, 2-aminopyridine hydrochloride, and 4-aminopyridine hydrochloride. Other hydrohalides, e.g., bromide, can also be used.

The pH-adjusting agents of U.S. Pat. No. 4,549,609 are ammoniacal nitrogen-containing compounds. Exemplary ammoniacal nitrogen pH-adjusting agents are ammonium hydroxide, ammonium salts of inorganic acids, ammonium salts of carboxylic acids, ammonium cyanate, derivatives of ammonium cyanate, ammonium thiocyanate, and a water-soluble ammonium or ammonium ion precursor. Exemplary derivatives of ammonium cyanate include cyanuric acid, urea cyanurate, and ammelide. The ammonium ion precursors are water-soluble materials which hydrolyze in the presence of steam to form ammonia and/or ammonium ions. One group of ammonium ion precursors are the amides of carbamic acid and thiocarbamic acid including, but not limited to, urea, biuret, triuret, thiourea, and ammonium carbamate. Another group of ammonium ion precursors are derivatives of carbamic acid and thiocarbamic acid, e.g., monomethylolurea and dimethylolurea.

Still another group of ammonium ion precursors are tertiary carboxylic acid amines and their substituted and alkylated amide counterparts having the formula

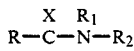

wherein (1) R is hydrogen or an organic radical, particularly an alkyl group containing 1 to about 8 carbon atoms, or an alpha-hydroxy substituted alkyl group containing 1 to about 8 carbon atoms, (2) $R_1$ and $R_2$ are independently selected from hydrogen and organic radicals, with alkyl groups containing 1 to about 8 carbon atoms being the preferred organic radical, and (3) X is oxygen or sulfur. Preferred tertiary carboxylic acid amides and their substituted and alkylated amide counterpart include formaldehyde, acetomide, N,N-dimethylformamide, N,N-diethylformamide, N,N-dimethylacetoamide, N,N-diethylacetoamide, N,N-digrogylacetoamide, N,N-dimethylgrogrionamide, and N,N-diethylgrogrionamide. Other pH-adjusting agents of this type include N-methyl, N-ethylacetoamide, N-methyl,N-octylgrogrionamide, N-methyl,N-hexyl-n-butyramide, N-methyl,N-propylcaproamide, and N,N-diethylcaprylamide.

In U.S. Pat. No. 4,572,296, the pH-adjusting agent is a mixture comprising (a) a compound selected from the group consisting of ammonium salts of inorganic acids, ammonium salts of carboxylic acids, quaternary ammonium halides, amine or substituted amine hydrohalides, and mixtures thereof, and (b) a compound selected from the group consisting of ammonia, salts which decompose in steam to form acid neutralizers or buffers having alkaline pH values, amides of carbamic acid or thiocarbamic acid and derivatives of such amides, tertiary carboxylic acid amides and their substituted and alkylated derivatives, and mixtures thereof.

The gH-adjusting agents of U.S. Pat. No. 4,714,112 are ammonium salts, such as ammonium sulfate and ammonium chloride.

The amount of gH-adjusting agent employed in the composition of the present invention is sufficient to maintain the pH liquid phase of the composition within the above-described ranges. Generally, about 0.1 to about 4 equivalents of the pH-adjusting agent is used per equivalent of bicarbonate present in the feed water.

The composition of the present invention is prepared by heating the feed water in a steam generator or other suitable device to generate steam. The fluorocarbon surfactant is injected either into the feed water upstream from the steam generator or into the steam downstream from the steam generator. The amount of fluorocarbon surfactant injected is, as discussed above, dependent upon the intended use of the resulting composition.

When employed, the pH-adjusting agent is also injected into either the feed water upstream from the steam generator and/or into the steam downstream from the steam generator. The amount of pH-adjusting agent injected is, as also discussed above, sufficient to maintain the pH of the liquid phase of the final composition within the desired pH range.

The composition of the present invention can be employed in various enhanced oil recovery procedures. For example, one version of the composition can be employed in a continuous or cyclic steam foam drive enhanced oil recovery process. Typical methodologies employed in continuous and cyclic steam foam drive enhanced oil recovery processes are well known to those skilled in the art. See, for example U.S. Pat. No. 3,933,133; U.S. Pat. No. 4,014,926; U.S. Pat. No. 4,267,887; U.S. Pat. No. 4,597,442; and U.S. Pat. No. 4,609,044, these patents being incorporated herein in their entirety by reference. In addition, the surface tension depressant embodiment of the composition of the present invention can be employed in continuous or cyclic steam drive procedures for reducing the surface tension within a formation. The process steps for both of these procedures are substantially the same, the basic difference in the processes being the fluorocarbon surfactant concentration in the composition.

In general, the cyclic enhanced oil recovery process of the present invention entails injecting the composition into a well that penetrates at least one oil-bearing formation. The composition is injected into at least a portion of the oil-bearing formation. The composition is shut into the well for a period of time, generally ranging from about 1 to about 2 weeks. Subsequent to the shut-in period, oil is withdrawn from the oil-bearing formation through substantially the same well.

In a continuous process embodying features of the present invention, the composition is injected into the oil-bearing formation through an injection well and the oil is withdrawn from the oil-bearing formation through a recovery well that penetrates the same oil-bearing formation. In an alternative embodiment of the process of the present invention, the injection of the composition of the present invention is either preceded and/or followed by the injection of substantially pure steam into at least a portion of the formation.

The amount of the composition injected into the formation is site specific. Typically, the amount of the composition injected into the formation is about 100 to about 10,000 barrels of feed water, but preferably is between about 250 to about 5,000 barrels, and more preferably about 1,000 to about 2,000 barrels.

The composition of the present invention enhances oil recovery procedures because, unlike prior art compositions, the fluorocarbon surfactant is no longer restricted to the liquid phase but now also is partitioned into the vapor phase. Therefore, the composition of the present invention enables those portions of the formation that are contacted by the vapor phase to experience the beneficial effects previously substantially restricted to those portions of the formation contacted by the liquid phase of the composition. For example, in the surface tension depressant embodiment of the present invention, because the vapor phase and liquid phase both contain fluorocarbon surfactant, the surface tension of the portion of the formation contacted by the vapor phase and the surface tension of the portion of the formation contacted by the liquid phase are now both reduced. In addition, in the foam forming embodiment of the present invention, by partitioning a portion of the fluorocarbon surfactant into the vapor phase, the composition of the present invention is now capable of forming additional foam when the vapor phase of a composition contacts a liquid as it passes through the formation. Accordingly, the composition of the present invention is useful for improving the efficacy of enhanced oil recovery procedures in which it is employed.

EXAMPLES

The following examples demonstrate (a) the inability of a hydrocarbon surfactant as well as of two fluorocarbon surfactants to partition into the vapor phase of a simulated steam generator effluent and (b) the ability of two fluorocarbon surfactants to partition into the liquid phase of a simulated steam generated effluent when the pH of the liquid phase of the effluent is maintained at a level within the scope of the present invention.

EXAMPLES 1-8

Simulated steam generator effluents having the compositions set forth in Table I were prepared. Two of the simulated generator effluents were maintained as a control and either a hydrocarbon surfactant or a fluorocarbon surfactant was added to each of the remaining simulated generator effluents. The resulting solutions were distilled and the vapor phase from each distillation process was condensed to form a condensate. The surface tension of each condensate is also set forth in Table I.

TABLE I

| Example | NaCL, g/l | $Na_2CO_3$, g/l | NaOH, g/l | KCl, g/l | $NH_4Cl$, g/l |
|---|---|---|---|---|---|
| 1 | 5 | 0.7 | 0.63 | 0.064 | — |
| 2 | 5 | 0.7 | 0.63 | 0.064 | — |
| 3 | 5 | 0.7 | 0.63 | 0.064 | — |
| 4 | 5 | 0.7 | 0.63 | 0.064 | — |
| 5 | — | — | — | — | 6 |
| 6 | — | — | — | — | 6 |
| 7 | — | — | — | — | 6 |
| 8 | — | — | — | — | 6 |

| $(NH_4)_2CO_3$, g/l | $NH_4OH$, ml/l | pH | Surfactant | Condensate Surface Tension, Dynes/cm |
|---|---|---|---|---|
| — | — | 11.9 | — | 47.5 |
| — | — | 11.9 | RP-2336[1] | 51.1 |
| — | — | 11.9 | FC-760[2] | 40.1 |
| — | — | 11.9 | FC-129[3] | 47.7 |
| 0.1 | 14 | 9.7 | — | 50.2 |
| 0.1 | 14 | 9.7 | RP-2336 | 46.6 |
| 0.1 | 14 | 9.7 | FC-760 | 22.5 |
| 0.1 | 14 | 9.7 | FC-129 | 24.9 |

[1]RP-2336 is a brand of hydrocarbon amine surfactant available from Petrolite Corporation.
[2]FC-760 is a brand of fluorinated alkylate nonionic surfactant available from 3M.
[3]FC-129 is a brand of fluorinated alkyl carboxylate anionic surfactant available from 3M.

As shown in Table I, simulated steam generator effluents having a pH of about 11.9 and containing either no surfactant, a hydrocarbon surfactant, or a fluorocarbon surfactant do not exhibit any substantial decrease in surface tension. This indicates that at a pH of about 11.9 none of the surfactants partitioned into the vapor phase. In contrast, in the simulated generator effluent having a pH of about 9.7, the condensates from the fluorocarbon surfactant containing effluents exhibited a substantial decrease in surface tension while the surface tension from condensates obtained from simulated generator effluents containing either no surfactant or a hydrocarbon surfactant again exhibited no substantial decrease in surface tension. Accordingly, Examples 1-8 demonstrate that, when the pH of the liquid phase of a steam-fluorocarbon surfactant containing composition is maintained at an exemplary pH within the the scope of the present invention, fluorocarbon surfactants are capable of partitioning into the vapor phase.

Although the present invention has been described in considerable detail with references to certain preferred versions thereof, other versions are possible. For example, the composition of the present invention can be employed to enhance the recovery of other natural resources such as natural gases. Therefore, the spirit and scope of the appended claims should not necessarily be limited to the description of the preferred versions contained herein.

What is claimed is:

1. A natural resource recovery system comprising:
    (a) a natural resource bearing formation;
    (b) a well penetrating the natural resource bearing formation; and
    (c) a composition for enhancing the recovery of the natural resource from the formation, the composition (i) being present in at least a portion of the natural resource bearing formation, and (ii) comprising steam having a vapor phase and a liquid phase, and a fluorocarbon surfactant, the liquid phase of the steam having a pH of less than about 11.

2. The system of claim 1 wherein the composition comprises a sufficient fluorocarbon surfactant concentration so that a condensate of the vapor phase has a surface tension of less than about 30 dynes/cm.

3. The system of claim 2 wherein the surface tension of the condensate is about 17 to about 30 dynes/cm.

4. The system of claim 1 wherein the liquid phase of the steam has a pH of about 7 to about 11.

5. The system of claim 1, wherein the composition has a fluorocarbon surfactant concentration of at least about 1 ppm by volume.

6. The system of claim 1 wherein the composition has a fluorocarbon surfactant concentration of less than about 10,000 ppm by volume.

7. The system of claim 1 wherein the composition has a fluorocarbon surfactant concentration of about 1 to about 10,000 ppm by volume.

8. The system of claim 1 wherein the fluorocarbon surfactant is selected from the group consisting of nonionic fluorocarbon surfactants, anionic fluorocarbon surfactants, and mixtures thereof.

9. The system of claim 1 wherein the fluorocarbon surfactant is selected from the group consisting of fluoroalkyl alkoxylates, fluoroalkyl esters, fluoroalkyl polyoxyethylene ethanols, and mixtures thereof.

10. The system of claim 1 wherein the fluorocarbon surfactant is selected from the group consisting of fluoroalkyl carboxylate salts, fluoroalkyl sulfonate salts, fluoroalkyl amidosulfonic acids, and mixtures thereof.

11. The system of claim 1 wherein the steam has a steam quality of at least about 5 weight percent.

12. The system of claim 1 wherein the steam has a steam quality of less than about 95 weight percent.

13. The system of claim 1 wherein the liquid phase of the steam has a pH of about 7 to about 11, the composition has a fluorocarbon surfactant concentration of about 1 to about 10,000 ppm by volume, the fluorocarbon surfactant is selected from the group consisting of nonionic fluorocarbon surfactants, anionic fluorocarbon surfactants, and mixtures thereof, and the steam has a steam quality of about 5 to about 95 weight percent.

14. The system of claim 1 wherein the composition further comprises a pH adjusting agent.

15. The system of claim 1 wherein the composition further comprises an ammoniacal nitrogen pH adjusting agent.

16. The system of claim 1 wherein the composition further comprises a sufficient concentration of a pH adjusting agent so that the pH of the liquid phase of the steam is about 7 to about 11.

17. The system of claim 1 wherein the composition has a fluorocarbon surfactant concentration of about 1 to about 10,000 ppm by volume, the fluorocarbon surfactant is selected from the group consisting of nonionic fluorocarbon surfactants, anionic fluorocarbon surfactants, and mixtures thereof, and the steam has a steam quality of about 5 to about 95 weight percent, and the composition further comprises a sufficient concentration of a pH adjusting agent so that the pH of the liquid phase of the steam is about 7 to about 11.

18. An oil recovery system comprising:
(a) an oil bearing formation;
(b) an injection well penetrating the oil bearing formation;
(c) a recovery well penetrating the oil bearing formation; and
(d) a composition for enhancing the recovery of the oil from the formation, the composition (i) being present in at least a portion of the oil bearing formation, and (ii) comprising steam having a vapor phase and a liquid phase, and a fluorocarbon surfactant, the liquid phase of the steam having a having a pH of less than about 11.

19. A process for recovering oil from an oil bearing formation, the process comprising the steps of:
(a) injecting a composition into at least a portion of an oil bearing formation, the composition comprising steam having a vapor phase and a liquid phase, and a fluorocarbon surfactant, the liquid phase having a pH of less than about 11; and
(b) withdrawing oil from the oil bearing formation.

20. The process of claim 19 further comprising the step of shutting the composition in the formation for a period of time prior to step (b).

21. The process of claim 19 wherein step (a) includes the step of injecting the composition into the formation through a well and step (b) includes the step of withdrawing the oil through substantially the same well.

22. The process of claim 19 wherein step (a) includes the step of injecting the composition into the formation through a first well and step (b) includes the step of withdrawing the oil through a second well.

23. The process of claim 19 further comprising the step of forming the composition.

24. The process of claim 23 wherein the composition forming step includes the steps of heating water to form the steam and then adding the fluorocarbon surfactant to the steam.

25. The process of claim 24 wherein the composition forming step further comprises the step of adding a pH adjusting agent to the water.

26. The process of claim 24 wherein the composition forming step further comprises the step of adding a pH adjusting agent to the steam prior to the addition of the fluorocarbon.

27. The process of claim 23 wherein the composition forming step includes the steps of adding the fluorocarbon surfactant to water to form a solution and heating the solution to form the composition.

28. The process of claim 27 wherein the composition forming step further comprises the step of adding a pH adjusting agent to the water.

29. The process of claim 19 wherein the composition injected in step (a) comprises a sufficient fluorocarbon surfactant concentration so that a condensate of the vapor phase has a surface tension of less than about 30 dynes/cm.

30. The process of claim 29 wherein the surface tension of the condensate is about 17 to about 30 dynes/cm.

31. The process of claim 19 wherein the liquid phase of the steam present in the composition being injected in step (a) has a pH of about 7 to about 11.

32. The process of claim 19 wherein the composition injected in step (a) has a fluorocarbon surfactant concentration of at least about 1 ppm by volume.

33. The process of claim 19 wherein the composition injected in step (a) has a fluorocarbon surfactant concentration of less than about 10,000 ppm by volume.

34. The process of claim 19 wherein the composition injected in step (a) has a fluorocarbon surfactant concentration of about 1 to about 10,000 ppm by volume.

35. The process of claim 19 wherein the fluorocarbon surfactant present in the composition injected in step (a) is selected from the group consisting of nonionic fluorocarbon surfactants, anionic fluorocarbon surfactants, and mixtures thereof.

36. The process of claim 19 wherein the fluorocarbon surfactant present in the composition injected in step (a) is selected from the group consisting of fluoroalkyl alkoxylates, fluoroalkyl esters, fluoroalkyl polyoxyethylene ethanols, and mixtures thereof.

37. The process of claim 19 wherein the fluorocarbon surfactant present in the composition injected in step (a) is selected from the group consisting of fluoroalkyl carboxylate salts, fluoroalkyl sulfonate salts, fluoroalkyl amidosulfonic acids, and mixtures thereof.

38. The process of claim 19 wherein the steam present in the composition injected in step (a) has a steam quality of at least about 5 weight percent.

39. The process of claim 19 wherein the steam present in the composition injected in step (a) has a steam quality of less than about 95 weight percent.

40. The process of claim 19 wherein the composition injected in step (a) has a fluorocarbon surfactant concentration of about 1 to about 10,000 ppm by volume, the fluorocarbon surfactant is selected from the group consisting of nonionic fluorocarbon surfactants, anionic fluorocarbon surfactants, and mixtures thereof, and the steam has a steam quality of about 5 to about 95 weight percent, and the liquid phase of the steam has a pH of about 7 to about 11.

41. The process of claim 19 wherein the composition injected in step (a) further comprises a pH adjusting agent.

42. The process of claim 19 wherein the composition injected in step (a) further comprises an ammoniacal nitrogen pH adjusting agent. adjusting agent.

43. The process of claim 19 wherein the composition injected in step (a) further comprises a sufficient concentration of a pH adjusting agent so that the pH of the liquid phase of the steam is about 7 to about 11.

44. The process of claim 19 wherein the composition injected in step (a) has a fluorocarbon surfactant concentration of about 1 to about 10,000 ppm by volume, the fluorocarbon surfactant is selected from the group consisting of nonionic fluorocarbon surfactants, anionic fluorocarbon surfactants, and mixtures thereof, and the steam has a steam quality of about 5 to about 95 weight percent, and the composition further comprises a sufficient concentration of a pH adjusting agent so that the pH of the liquid phase of the steam is about 7 to about 11.

45. A process for recovering oil from an oil bearing formation, the process comprising the steps of:
   (a) injecting steam into at least a portion of an oil bearing formation;
   (b) injecting a composition into at least a portion of the oil bearing formation, the composition comprising steam having a vapor phase and a liquid phase, and a fluorocarbon surfactant, the liquid phase having a pH of less than about 11; and
   (c) withdrawing oil from the oil bearing formation.

46. The process of claim 45 wherein step (a) is performed before step (b).

47. The process of claim 45 wherein step (b) is performed before step (a).

48. The process of claim 45 wherein step (a) is performed before step (b), and further comprising the step of repeating step (a) after step (b).

49. A natural resource recovery system comprising:
   (a) a natural resource bearing formation;
   (b) a well penetrating the natural resource bearing formation; and
   (c) a composition for enhancing the recovery of the natural resource from the formation, the composition (i) being present in at least a portion of the natural resource bearing formation, and (ii) comprising steam having a vapor phase and a liquid phase, and a surface tension reducing concentration of a fluorocarbon surfactant in the vapor phase.

50. The system of claim 49 wherein a condensate of the vapor phase has a surface tension of less than about 30.

51. A natural resource recovery system comprising:
   (a) a natural resource bearing formation;
   (b) a well penetrating the natural resource bearing formation; and
   (c) a composition for enhancing the recovery of the natural resource from the formation, the composition (i) being present in at least a portion of the natural resource bearing formation, and (ii) comprising steam having a vapor phase and a liquid phase, and a sufficient concentration of a fluorocarbon surfactant so that at least about 0.5 ppm by volume of the fluorocarbon surfactant is present in a condensate of the vapor phase.

52. The system of claim 51 wherein the condensate comprises about 0.54 to about 5,000 ppm by volume fluorocarbon.

53. A natural resource recovery system comprising:
   (a) a natural resource bearing formation;
   (b) a well penetrating the natural resource bearing formation; and
   (c) a composition for enhancing the recovery of the natural resource from the formation, the composition (i) being present in at least a portion of the natural resource bearing formation, and (ii) comprising steam having a vapor phase and a liquid phase, and a foam forming concentration of a fluorocarbon surfactant in the vapor phase.

54. A natural resource recovery system comprising:
   (a) a natural resource bearing formation;
   (b) a well penetrating the natural resource bearing formation; and
   (c) a composition for enhancing the recovery of the natural resource from the formation, the composition (i) being present in at least a portion of the natural resource bearing formation, and (ii) comprising (A) a fluorocarbon surfactant and (B) steam having a vapor phase and a liquid phase, wherein the ratio of the fluorocarbon surfactant concentration in the liquid phase to the fluorocarbon surfactant concentration in the vapor phase of the steam is about 1:1 to about 5:1.

55. The system of claim 54 wherein a foam forming concentration of fluorocarbon surfactant is present in the vapor phase.

56. The system of claim 54 wherein at least about 0.5 ppm by volume of the fluorocarbon surfactant is present in a condensate of the vapor phase.

57. The system of claim 54 wherein a surface tension reducing concentration of a fluorocarbon surfactant is present in the vapor phase.

58. The system of claim 54 wherein the liquid phase of the steam has a pH of less than about 11.

59. The system of claim 54 wherein the liquid phase of the steam has a pH of less than about 11, and the vapor phase contains a foam forming and surface tension reducing concentration of fluorocarbon surfactant.

60. The system of claim 59 wherein at least about 0.5 ppm by volume of the fluorocarbon surfactant is present in a condensate of the vapor phase.

61. A process for recovering oil from an oil bearing formation, the process comprising the steps of:
   (a) injecting a composition into at least a portion of an oil bearing formation, the composition comprising steam having a vapor phase and a liquid phase, and a surface tension reducing concentration of a fluorocarbon surfactant in the vapor phase; and
   (b) withdrawing oil from the oil bearing formation.

62. The process of claim 61 wherein a condensate of the vapor phase has a surface tension of less than about 30.

63. A process for recovering oil from an oil bearing formation, the process comprising the steps of:
   (a) injecting a composition into at least a portion of an oil bearing formation, the composition comprising steam having a vapor phase and a liquid phase, and a sufficient concentration of a fluorocarbon surfactant so that at least about 0.5 ppm by volume of the fluorocarbon surfactant is present in a condensate of the vapor phase; and
   (b) withdrawing oil from the oil bearing formation.

64. The process of claim 63 wherein the condensate comprises about 0.5 to about 5,000 ppm by volume fluorocarbon.

65. A process for recovering oil from an oil bearing formation, the process comprising the steps of:
   (a) injecting a composition into at least a portion of an oil bearing formation, the composition comprising steam having a vapor phase and a liquid phase, and a foam forming concentration of a fluorocarbon surfactant in the vapor phase; and
   (b) withdrawing oil from the oil bearing formation.

66. A process for recovering oil from an oil bearing formation, the process comprising the steps of:
   (a) injecting a composition into at least a portion of an oil bearing formation, the composition comprising (A) a fluorocarbon surfactant and (B) steam having a vapor phase and a liquid phase, wherein the ratio of the fluorocarbon surfactant concentration in the liquid phase to the fluorocarbon surfactant concentration in the vapor phase of the steam is about 1:1 to about 5:1; and (b) withdrawing oil from the oil bearing formation.

67. The process of claim 66 wherein a foam forming concentration of fluorocarbon surfactant is present in the vapor phase.

68. The process of claim 66 wherein at least about 0.5 ppm by volume of the fluorocarbon surfactant is present in a condensate of the vapor phase.

69. The process of claim 66 wherein a surface tension reducing concentration of a fluorocarbon surfactant is present in the vapor phase.

70. The process of claim 66 wherein the liquid phase of the steam has a pH of less than about 11.

71. The process of claim 66 wherein the liquid phase of the steam has a pH of less than about 11, and the vapor phase contains a foam forming and surface tension reducing concentration of fluorocarbon surfactant.

72. The process of claim 71 wherein at least about 0.5 ppm by volume of the fluorocarbon surfactant is present in a condensate of the vapor phase.

* * * * *

UNITED STATES PATENT AND TRADEMARK OFFICE
CERTIFICATE OF CORRECTION

PATENT NO. : 4,923,009

DATED : May 8, 1990

INVENTOR(S) : David R. Watkins

It is certified that error appears in the above-identified patent and that said Letters Patent is hereby corrected as shown below:

Claim 42, line 3, delete "adjusting agent" (second occurrence).

Claim 52, line 2, replace "0.54" with -- 0.5 --.

Signed and Sealed this

Eleventh Day of June, 1991

*Attest:*

HARRY F. MANBECK, JR.

*Attesting Officer*     Commissioner of Patents and Trademarks